3,655,581
COMPOSITION AND PROCESS FOR PREPARING FLEXIBLE POLYESTER BASED POLYURETHANE FOAMS
Richard A. Bachura, Midland, Mich., assignor to Dow Corning Corporation, Midland, Mich.
No Drawing. Filed Sept. 25, 1968, Ser. No. 762,613
Int. Cl. B01f 17/00
U.S. Cl. 252—351      7 Claims

ABSTRACT OF THE DISCLOSURE

A composition is disclosed which consists essentially of (1) 75 to 95 percent by weight of a trimethylsilyl endblocked siloxane-polyoxyethylene copolymer, and (2) 5 to 25 percent by weight of a fatty acid having from 10 to 40 carbon atoms. This composition is useful as a surfactant in the preparation of flexible polyester based polyurethane foams where it minimizes problems of splitting and shrinkage of the foams, promotes uniformity of cell size, promotes compatibility of the reactants and catalyst, and allows wider processing and formulation latitude.

---

The preparation of polyester based polyurethane foams is described numerous places in the literature. Reference may be had, for example, to U.S. Patent Re. 24,514, the disclosure of which is incorporated herein by reference, for a disclosure of specific examples of the basic components used in preparing such a foam and for a processing technique for preparing such foams.

It has become the practice to employ a "surfactant" in the preparation of polyurethane foams which is added for the purpose of controlling the cell size and/or stabilizing the foam. However, with the heretofore available surfactants uniformity and reproducibility of cell size are still a problem. Other problems frequently encountered include the splitting and shrinkage of the foam; failure of the foam to rise uniformly; poor compatibility of the reactants and the amine catalysts and narrow operation and formulation latitude.

It has now been unexpectedly discovered that when a particular composition unknown heretofore is employed as a surfactant in the preparation of these polyester based polyurethane foams, the foregoing problems can be overcome or substantially minimized.

More specifically, this invention relates to a composition which consists essentially of (1) 75 to 95 percent by weight of a trimethylsilyl endblocked siloxane-polyoxyethylene copolymer of the general formula

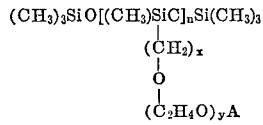

$n$ has a value of from 1 to 8,
$x$ has an average value of from 2 to 12,
$y$ has an average value of from 8 to 60, and
A is a capping group, and (2) 5 to 25 percent by weight of a fatty acid having from 10 to 40 carbon atoms.

This invention further relates to an improvement in a process of preparing a flexible polyester based polyurethane foam wherein a surfactant is employed to control cell size and/or stabilize the foam, the improvement which comprises employing as the surfactant the composition as defined above.

The siloxane-polyoxyethylene copolymers employed in the composition and process of this invention can be prepared by the well known process of adding a terminally unsaturated polyoxyethylene glycol to the appropriate Si—H containing siloxane in the presence of a suitable catalyst such as chloroplatinic acid. The preparation is illustrated by the following equation:

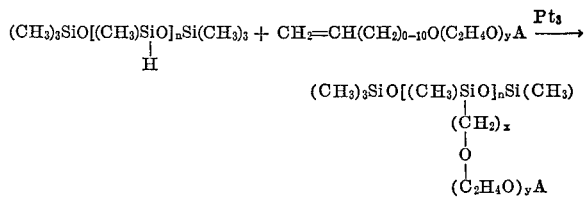

As should be apparent from the above formula, the operable polyoxyethylene-siloxane copolymers are those which are trimethylsilyl endblocked and contain from 1 to 8 (methyl)polyoxyethylene siloxane units in the chain. While the pure species can be employed in the composition of this invention, i.e. $n$ can be 1, 2, 3, 4, 5, 6, 7, or 8, generally speaking a mixture of these species will be used since it is much more economical and there is little difference if any in the performance obtained. One particularly preferred mixture is composed of 50 to 75 mol percent of the trimer species ($n=1$) and 25 to 50 mol percent of the tetramer species ($n=2$). Of the individual species, the trimer is preferred at this time.

It should be noted that these copolymers contain no dimethylsiloxane units in the chain. The presence of such units, particularly in significant amounts has a detrimental effect on a polyester based polyurethane foam prepared from it.

The polyoxyethylene portion of the copolymer is attached to the silicon atom via an alkylene bridge, usually a polymethylene bridge, as can readily be seen from the above formula. This alkylene bridge can contain, on an average, from 2 to 12 carbon atoms, that is to say, $x$ has an average value of from 2 to 12.

On the average, there are from 8 to 60 of the polyoxyethylene units in the copolymers useful in the above composition. That is, $y$ has an average value of from 8 to 60.

The polyoxyethylene unit is terminated or capped by the A group. Thus the polyoxyethylene unit can be capped by a hydroxyl group (A is a hydrogen atom), by an ether group (A is a monovalent hydrocarbon radical such as a methyl, butyl, vinyl or phenyl radical), by a carboxyl radical, by the salt or ester of a carboxyl radical, or a carbonate ester group. The preferred embodiment at this time is when A is a hydrogen atom.

The second component of the composition of this invention is a fatty acid having from 10 to 40 carbon atoms. The fatty acids useful herein can be either saturated or unsaturated, monobasic or polybasic, acids. The term "fatty acid" as employed herein is also intended to include the dimerized or trimerized fatty acids. While it is possible to use the individual species, it is preferred to employ mixtures of the fatty acids since they occur naturally in such mixtures and are frequently marketed as such. Specific examples of fatty acids that can be employed herein include lauric, oleic, stearic and n-octatriacontanoic acid. Specific examples of mixtures of fatty acids that can be employed herein include the tall oil fatty acids and soybean fatty acids. An example of a suitable commercial dimer acid is a $C_{36}$ aliphatic dibasic acid prepared by the dimerization of a $C_{18}$ unsaturated fatty acid and is sold under the trademark Empol 1024.

The amount of the above composition employed in preparing a polyester based polyurethane foam will vary depending upon the exact characteristics desired in the final product, the specific process and formulation used, and individual preferences. Generally speaking, however, the amount of the composition employed will be within the range of 0.1 to 2.0 (preferably 0.5 to 1.0) percent based on the total weight of the polyurethane foam composition.

Now in order that those skilled in the art may better understand how the present invention can be practiced, the following examples are given by way of illustration and not by way of limitation.

All parts and percents referred to herein are on a weight basis and all viscosities were measured at 25° C., unless otherwise specified. The toluene diisocyanate used consisted of the usual 80/20 ratio of the 2,4 and 2,6 isomers unless otherwise noted.

EXAMPLE 1

A mixture was prepared which consisted essentially of 3 parts of water, 1 part of N-ethyl morpholine, 0.2 part N,N-dimethyl hexadecyl amine and 1 part of a composition which consisted essentially of 90 percent of a siloxane-polyoxyethylene copolymer consisting essentially of about 63 mol percent

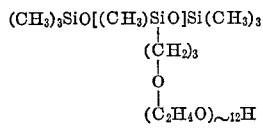

and about 37 mol percent of

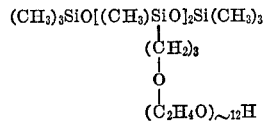

and about 10 percent of a $C_{36}$ dimer acid (Empol 1024). The foregoing mixture was added to 100 parts of glycol-adipate polyester polyurethane resin in a one quart paper cup. The resin and the premix were mixed for about 30 seconds at 1200 r.p.m. and then a 3 percent excess (103 Index) of toluene diisocyanate was added to the paper cup and mixed again for 5 seconds at 1000 r.p.m. The resulting mix was then poured into a three quart paper bucket and allowed to foam unrestricted. This resulted in a very good polyurethane foam having uniform cell size.

EXAMPLE 2

The procedure of Example 1 was repeated except that the initial composition contaned 4 parts of water and 2 parts of N-ethyl morpholine. Essentially identical results were obtained.

EXAMPLE 3

Two polyester based polyurethane foams were prepared by adding 10.8 g. of a premix to 150 g. of a commercial glycol-adipate polyester resin (Fomrez 50) and mixing for 30 seconds at 1200 r.p.m. and then adding 58.5 cc. of toluene diisocyanate and mixing 5 seconds at 1000 r.p.m. The resulting mix was poured into a three quart paper bucket and allowed to foam unrestricted. Upon completion of the rise the foam was allowed to cure. The premixes consisted of 4 parts of water, 2 parts N-ethyl morpholine, 1 part surfactant and 0.2 part N,N-dimethyl hexadecyl amine.

In foam I the surfactant was a composition consisting essentially of (1) about 90 percent of siloxane-polyoxyethylene copolymer consisting essentially of about 62 mol percent

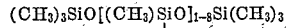
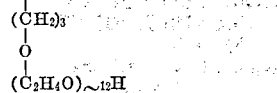

and about 38 mol percent

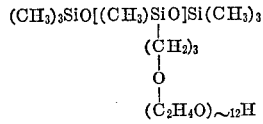
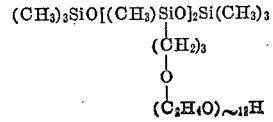

and (2) about 10 percent of $C_{36}$ dimer acid (Empol 1024).

In foam II the surfactant was a composition consisting essentially of (1) about 90 percent of the siloxane-polyoxyethylene copolymer mixture

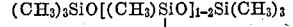
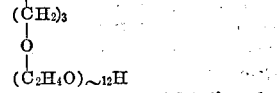

and (2) about 10 percent of $C_{36}$ dimer acid (Empol 1024).

The above prepared foams had the following characteristics.

| Foam | Rise time (seconds) | Cells per 10 mm. |
|---|---|---|
| I | 70.0 | 20–23 |
| II | 70.5 | 22–23 |

EXAMPLE 4

A series of four polyester based polyurethane foams was prepared following the procedure of Example 3. The compositions of the foams were as follows:

(I) 100 parts of a commercial glycol-adipate polyester resin (Fomrez 50), 3 parts water, 1 part N-ethyl morpholine, 1 part of a surfactant composition consisting essentially of (1) 90 percent of

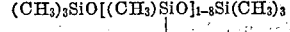
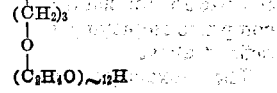

and (2) 10 percent oleic acid, 0.2 part N,N-dimethyl hexadecyl amine, and 3 percent excess (103 Index) toluene diisocyanate.

(II) Identical to I except that tall oil fatty acids were substituted for the oleic acid in the surfactant composition.

(III) Identical to I except that 4 parts of water and 2 parts of N-ethyl morpholine were used.

(IV) Identical to III except that tall oil fatty acids were substituted for the oleic acid in the surfactant composition.

All four of the compositions produced good foams having uniform cell size.

EXAMPLE 5

A series of foams was prepared following the procedure of Example 3 except that a 7 second mixing time was used when the toluene diisocyanate was added, and the amounts of siloxane-polyoxyethylene copolymer and dimer acid in the surfactant were varied as shown in the table below. The rise times and breathability of three foams prepared with each formulation is also set forth in the table.

| Surfactant, percent | | Rise time (seconds) | | | Breathability (ft.³/min.) | | |
|---|---|---|---|---|---|---|---|
| Copolymer | Dimer | I | II | III | I | II | III |
| 95 | 5 | 71.5 | 72.4 | 73.8 | 0.34 | 0.38 | 0.25 |
| 90 | 10 | 72.8 | 72.4 | 72.4 | | 0.32 | 0.14 |
| 85 | 15 | 72.3 | 73.4 | 72.8 | 0.15 | 0.14 | 0.24 |
| 80 | 20 | | 72.7 | 72.9 | 0.42 | 0.23 | 0.14 |

EXAMPLE 6

Two foams were prepared following the procedure of Example 3 except that 10.2 g. of the premix and 55.3 ml. of the toluene diisocyanate was used.

In foam I the premix consisted essentially of 3.6 parts water, 1.8 parts N-ethyl morpholine, 0.4 part N,N-dimethyl hexadecyl amine, 1 part of a surfactant composition consisting essentially of (1) 80 percent of a and (2) 20 percent of $C_{36}$ dimer acid, and 4 parts of a flame retardant.

In foam II the premix was identical to that of foam I except that the surfactant contained 75 percent (1) and 25 percent (2).

Foam I had a rise time of 72.2 seconds whereas foam II had a rise time of 72 seconds. Both were good foams having uniform cell size and with foam I being somewhat finer celled than foam II.

EXAMPLE 7

A mixture having a ratio of 100 parts of a commercial glycol-adipate polyester polyurethane resin and 10 parts of trichloromonofluoromethane was prepared. To 140 parts of the foregoing mixture there was added 6.62 parts of a premix having a trio of 3 parts water, 1 part N-ethylmorpholine, 1 part of a surfactant composition and 0.2 part N,N-dimethyl hexadecyl amine and then the two mixed for 30 seconds at 1200 r.p.m. Then 39.6 ml. of toluene diisocyanate (3 percent excess) was added and mixed for 5 seconds at 1000 r.p.m. The resulting mix was poured into a three quart paper bucket and allowed to foam unrestricted, and then cured. Two different surfactant compositions and two toluene diisocyanates (80/20 and 65/35 ratios of the 2,4 and 2,6 isomers) were used. Surfactant I was a composition consisting essentially of (1) 90 percent of

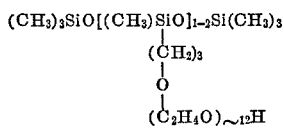

and (2) 10 percent of $C_{36}$ dimer acid. Surfactant II was identical to surfactant I except that it contained 80 percent (1) and 20 percent (2). The foams in all cases were good with those from the 65/35 toluene diisocyanate being finer celled foams. The rise times of the various foams is set forth below.

| Surfactant | Rise time (seconds) | | Breathability (ft.³/min.) | | Cell count/10 mm. | |
| --- | --- | --- | --- | --- | --- | --- |
| | 80/20 | 65/35 | 80/20 | 65/35 | 80/20 | 65/35 |
| I | 177 | 156 | 0.19 | 0.62 | 14 | 14 |
| II | 172 | 159 | 0.28 | 0.23 | 15–16 | 19 |

EXAMPLE 8

A polyester based polyurethane foam was prepared by mixing 100 parts of a commercial glycol-adipate polyester resin (Fomrez 50), 4 parts of water, 2 parts of N-ethyl morpholine, 0.2 part N,N-dimethyl cetyl amine, 0.1 part dimer acid (Empol 1024) and 0.9 part of a composition consisting essentially of

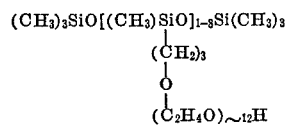

for about 30 seconds at 1200 r.p.m., then adding toluene diisocyanate (80/20 ratio of the 2,4 and 2,6 isomers) in 3 percent excess (103 Index) and mixing for about 7 seconds at 1000 r.p.m., allowing the foam to rise completely, and then air curing the foam. This foam had a rise time of 73.4 seconds.

A second foam was prepared as above except that 3 parts of water and 1 part of N-ethyl morpholine were used. This foam had a rise time of 120 seconds.

Both of the above foams were very good and had uniform cells.

EXAMPLE 9

When the following surfactant compositions are substituted for those of the preceding examples, polyester based polyurethane foams are obtained which have uniform cell size and in which problems of splitting and shrinkage are minimal.

(I) A composition which consists essentially of (1) 87 percent of

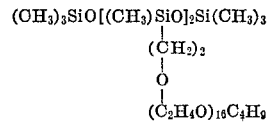

and (2) 13 percent stearic acid.

(II) A composition which consists essentially of (1) 83 percent of

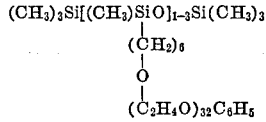

and (2) 17 percent lauric acid.

(III) A composition which consists essentially of (1) 90 percent of

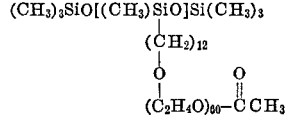

and (2) 10 percent $C_{36}$ dimer acid.

(IV) A composition which consists essentially of (1) 80 percent of

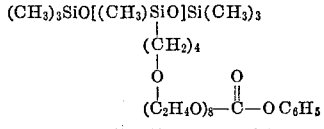

and (2) 20 percent tall oil fatty acids.

That which is claimed is:

1. A composition which consists essentially of
   (1) 75 to 95 percent by weight of a trimethylsilyl end-blocked siloxane-polyoxyethylene copolymer of the general formula

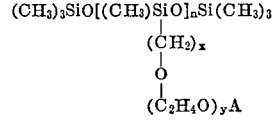

wherein
   $n$ has a value of from 1 to 8,
   $x$ has an average value of from 2 to 12,
   $y$ has an average value of from 8 to 60, and
   A is a capping group selected from the group consisting of the hydrogen atom, monovalent hydrocarbon radicals, carboxyl radicals, salts of carboxyl radicals, esters of carboxyl radicals and carbonate esters, and
   (2) 5 to 25 percent by weight of a fatty acid having from 10 to 40 carbon atoms.

2. The composition as defined in claim 1 wherein $x$ has an average value of from 3 to 5, $y$ has an average value of from 8 to 16, and (2) has 16 to 20 carbon atoms.

3. The composition as defined in claim 2 wherein $n$ has a value of from 1 to 2, $x$ has an average value of 3, $y$ has an average value of about 12, and A is a hydrogen atom.

4. The composition as defined in claim 3 wherein 50 to 75 mol percent of (1) is the species wherein $n$ is 1 and 25 to 50 mol percent of (1) is the species wherein $n$ is 2, and $x$ is 3.

5. The composition as defined in claim 1 wherein 50 to 75 mol percent of (1) is the species wherein $n$ is 1 and 25 to 50 mol percent of (1) is the species wherein $n$ is 2, $x$ is 3, $y$ has an average value of about 12, A is a hydrogen atom, and (2) is a dimer acid.

6. The composition as defined in claim 5 wherein (1) is 90 percent and (2) is 10 percent.

7. The composition as defined in claim 5 wherein (1) is 80 percent and (2) is 20 percent.

References Cited

UNITED STATES PATENTS

| Re. 25,727 | 2/1965 | Haluska | 260—448.2 |
|---|---|---|---|
| 2,462,758 | 2/1949 | Malkemus | 252—161 |
| 2,823,218 | 2/1958 | Speier | 260—448.2 |
| 3,105,769 | 10/1963 | Ellerin | 106—287 |
| 3,402,192 | 9/1968 | Haluska | 260—448.2 |
| 3,518,344 | 6/1970 | Welsh | 252—106 |
| 2,990,377 | 6/1961 | May | 252—351 |

JOHN D. WELSH, Primary Examiner

U.S. Cl. X.R.

252—356, 352; 260—2.5